(12) United States Patent
Chen

(10) Patent No.: US 6,923,841 B2
(45) Date of Patent: Aug. 2, 2005

(54) FILTER ELEMENT OF AN AIR FILTER WITH FAR INFRARED ENERGY

(76) Inventor: Tung-Sen Chen, No. 7-3, Lane 7, Alley 128, Section3, Showlung, Chungho City, Taipei (TW)

( * ) Notice: Subject to any disclaimer, the term of this patent is extended or adjusted under 35 U.S.C. 154(b) by 0 days.

(21) Appl. No.: 10/439,900

(22) Filed: May 19, 2003

(65) Prior Publication Data

US 2003/0196420 A1 Oct. 23, 2003

Related U.S. Application Data

(63) Continuation of application No. 09/768,280, filed on Jan. 25, 2001, now abandoned.

(30) Foreign Application Priority Data

Jan. 5, 2001 (CN) .......................................... 01100502

(51) Int. Cl.[7] .......................... B01D 46/00; B01D 39/14
(52) U.S. Cl. .......................... 55/497; 55/385.3; 55/495; 55/498; 55/500; 55/511; 55/521; 55/523; 55/524; 55/527; 55/528; 55/DIG. 39; 123/198 E; 123/539
(58) Field of Search .............................. 55/385.3, 495, 55/497, 498, 500, 511, 521, 522, 523, 524, 527, 528, DIG. 39; 123/198 E, 536, 537, 538, 539; 423/69, 399; 428/372; 131/202; 156/298

(56) References Cited

U.S. PATENT DOCUMENTS

| | | | | |
|---|---|---|---|---|
| 3,702,049 A | * | 11/1972 | Morris, Jr. ................... | 156/298 |
| 4,772,455 A | * | 9/1988 | Izumi et al. ................... | 55/527 |
| 5,111,797 A | * | 5/1992 | Shikanai ..................... | 123/539 |
| 5,238,661 A | * | 8/1993 | van Ghemen et al. ...... | 423/399 |
| 5,692,481 A | * | 12/1997 | Miller ......................... | 123/539 |
| 5,817,427 A | * | 10/1998 | Ishida et al. ................. | 55/521 |
| 5,928,784 A | * | 7/1999 | Sugihara et al. ....... | 55/DIG. 39 |
| 6,082,339 A | * | 7/2000 | Wey ............................ | 123/538 |
| 6,244,254 B1 | * | 6/2001 | Chen .......................... | 123/539 |
| 6,263,865 B1 | * | 7/2001 | Koyama et al. ............ | 123/539 |
| 6,309,451 B1 | * | 10/2001 | Chen .......................... | 55/385.3 |

FOREIGN PATENT DOCUMENTS

| | | | | |
|---|---|---|---|---|
| JP | 1-314716 | * | 12/1989 | ................. 428/372 |
| JP | 3-83571 | * | 4/1991 | ................. 131/202 |

* cited by examiner

Primary Examiner—Duane Smith
Assistant Examiner—Jason M. Greene
(74) Attorney, Agent, or Firm—H.C. Lin Patent Agent

(57) ABSTRACT

A filter element of an air filter includes a main body and a substrate. The far infrared emission powder substances are embedded at certain grain sized and at certain ratio to the substrate, thereby forming the main body that is adapted in form to various internal combustion engines. The resonance effect will be created by means of the far infrared emission substances in the filter element of the air filter, thereby making tiny the molecular cluster of water in the moisture-containing air entering into the internal combustion engine for combustion, increasing the molecular freedom, enlarging the contact surface of the oil gas with the air. Therefore, it's easier that the oxygen-containing particles and the oil gas are evenly mixed for reaching an optimal mixture ratio of the original design standard. As a result, the combustion in the engine is complete, thereby effectively reducing the discharge of the exhaust, regaining the original horse power of the internal combustion engine, preventing the engine chamber from carbon deposit and prolonging the life of the components thereof. Moreover, the vacuum degree of the vacuum pump can be raised for stabilizing the braking efficiency.

12 Claims, 3 Drawing Sheets

FILTER ELEMENT OF AN AIR FILTER WITH FAR INFRARED ENERGY

This application is continuation of application Ser. No. 09/768,280 filed Jan. 25, 2001 (abandoned).

BACKGROUND OF THE INVENTION

1. Field of the Invention

The present invention relates to a filter element of an air filter with far infrared energy, and more particularly, to powder substances with high far infrared emission rate that are embedded to the filter element of the air filter of an internal combustion engine and allow the molecular cluster of water in the air entering into the internal combustion engine for combustion to be made tiny and to increase the molecular freedom for enhancing the burning efficiency, reducing the discharge of the exhaust, regaining the original horsepower, prolonging the life of components thereof and raising and stabilizing the braking efficiency.

2. Description of the Prior Art

A conventional filter element of the air filter of an internal combustion engine is made of paper or polymer material in various forms to meet the requirements of all kinds of the internal combustion engines. However, this filter element, without improving the quality of the entering air, can only be used to filter coarse dusts and impurities and to make the disturbed air flow smoothly for reducing the noise when the air passes through the carburetor, the muffler and the valve.

Moreover, the vacuum degree of the suction pipe in a conventional vacuum type braking system is often influenced since the combustion efficiency in the engines can't reach the original standard. In other words, loss of the air density and the vacuum degree in the engine is existing. In braking, the force of the vacuum pump upon the braking pump is configured in such a way that the braking efficiency ratio of the front and the rear wheels amounts to 7:3 or 6:4. However, the braking efficiency of the front and the rear wheels can't, in fact, be reached due to the insufficiency of the vacuum degree in the suction pipe. As a result, it often happens that the front wheels have the braking effect while the rear wheels can't be exactly stopped, causing the front end of the car seriously sinks while the tail thereof is raised, thrown away or slipped to the side in case of an emergency brake.

SUMMARY OF THE INVENTION

It is a primary object of the present invention to eliminate the aforementioned drawbacks and to provide a filter element of an air filter with far infrared energy which enables a complete combustion, reduces the discharge of exhaust, regains the original horsepower, prevents the engine chamber from carbon deposit and prolongs the life of components thereof.

It is another object of the present invention to provide a filter element of an air filter with far infrared energy which enables the braking effect more stable for ensuring the driving safety.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figures 1, 1A:
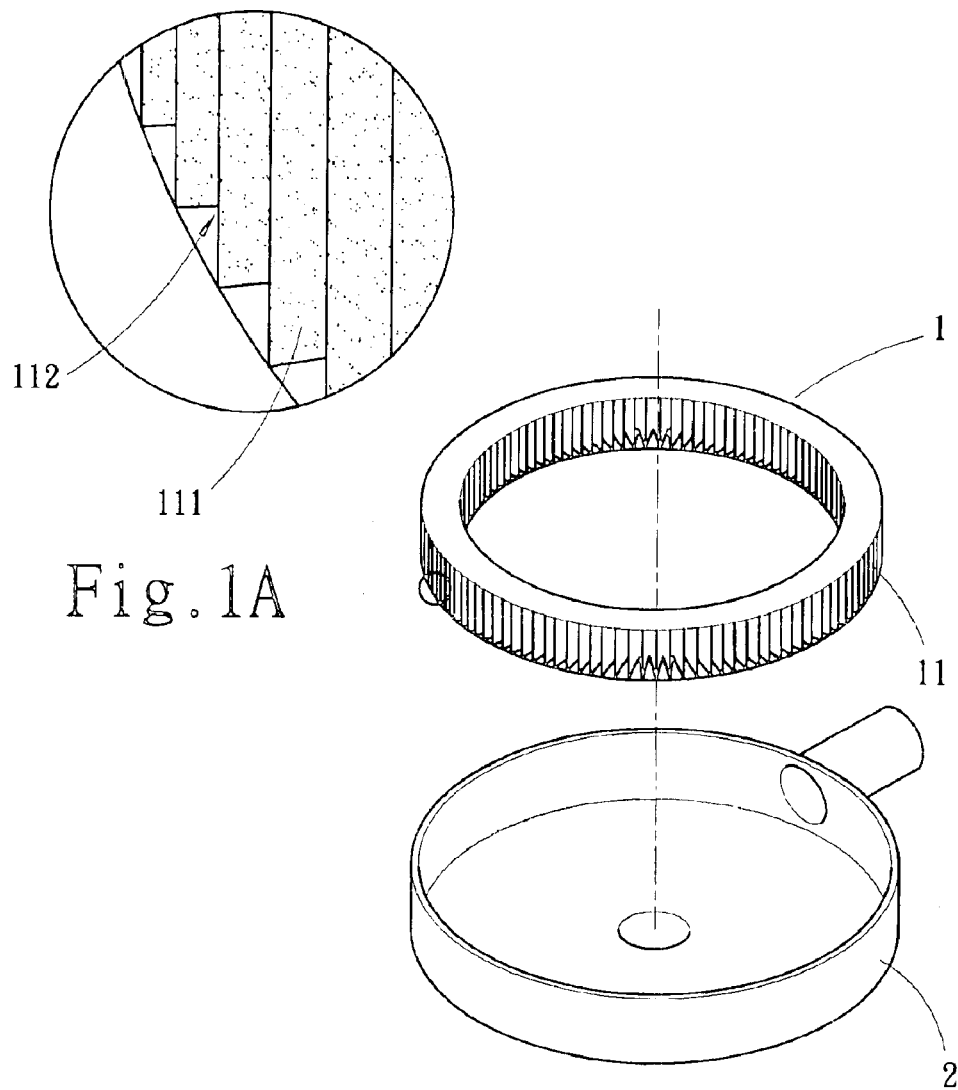
FIG. 1 is a perspective exploded view of a preferred embodiment of the present invention.
FIG. 1A is a partially enlarged view of the preferred embodiment of the present invention.

First of all, referring to FIGS. 1 and 1A, the filter element 1 of an air filter with far infrared energy in accordance with the present invention includes a main body 11 which is processed and formed according to the design requirement of the internal combustion engine and adapted to the shape of a housing 2 for use in the internal combustion engine. Substances with 80% weight ratio far infrared emission rate are embedded to the substrate 112 of the filter element 1 of the air filter at a proper ratio between 1 and 50% (preferably 2~30%) weight ratio, thereby forming the corrugated main body 11 of the filter element 1 of the air filter. The far infrared emission substances 111 of the main corrugated body 11 are made by mixing aluminum oxide ($Al_2O_3$), zirconium oxide ($ZrO_2$), antimony oxide ($SbO_2$), titanium oxide ($TiO_2$), cobalt oxide (CoO), iron oxide ($Fe_2O_3$) and silicium carbide (SiC) at the weight ratio of 1:1:1:1:1:1:1 or 3:3:3:1:1:2:2 and thereafter formed by sintering and grinding procedures while the average grain size of the far infrared emission powder substances amounts to 0.01~30 $\mu$m. In addition, the substrate 112 of the main corrugated body 11 of the filter element 1 of the air filter is made of paper pulp or single (or composite) polymer material (e.g. polyethylene, polypropylene, polyurethane, nylon, etc.). Accordingly, the resonance effect will be created by means of the effect of the far infrared emission substances in the filter element of the air filter, thereby making tiny the molecular cluster of water in the moisture-containing air entering into the internal combustion engine for combustion, increasing the molecular freedom thereof, enlarging the contact surface of the oil gas with the air. Therefore, it's easier that the oxygen particles and the oil gas are evenly and exactly mixed for reaching an optimal mixture ratio of the original design standard. As a result, the combustion in the engine is complete, thereby effectively reducing the discharge of the exhaust, regaining the original horse power of the internal combustion engine, preventing the engine chamber from carbon deposit, and prolonging the life of the components thereof.

Figure 2:
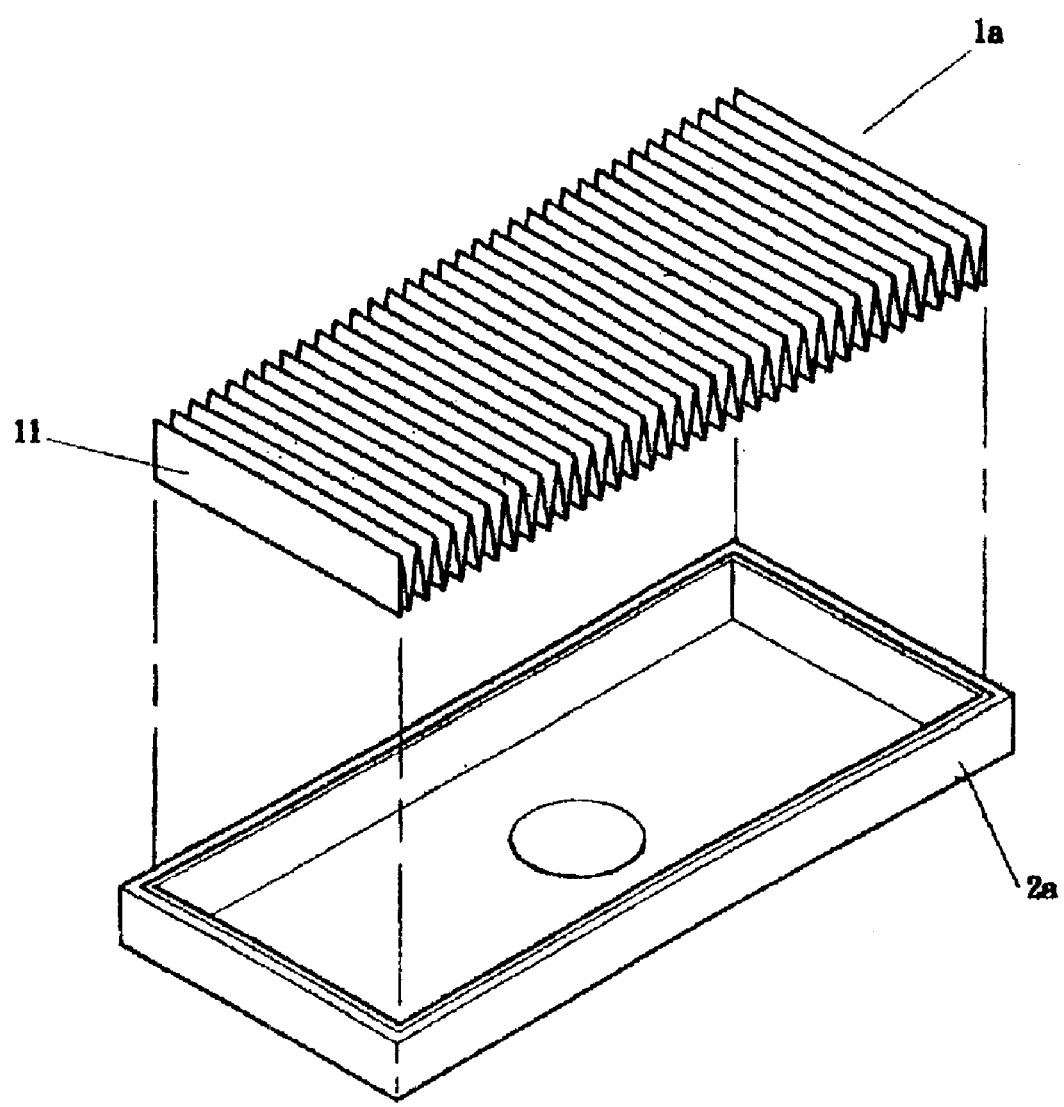
FIG. 2 is a perspective exploded view of another preferred embodiment of the present invention.

FIG. 2 shows a perspective exploded view of another preferred embodiment of the present invention. It's apparent from FIG. 2 that the main corrugated-body 11 of the filter element 1a of an air filter with far infrared energy is formed in shape of the rectangular housing 2a to adapt to different shapes of the internal combustion engines.

Figure 3:
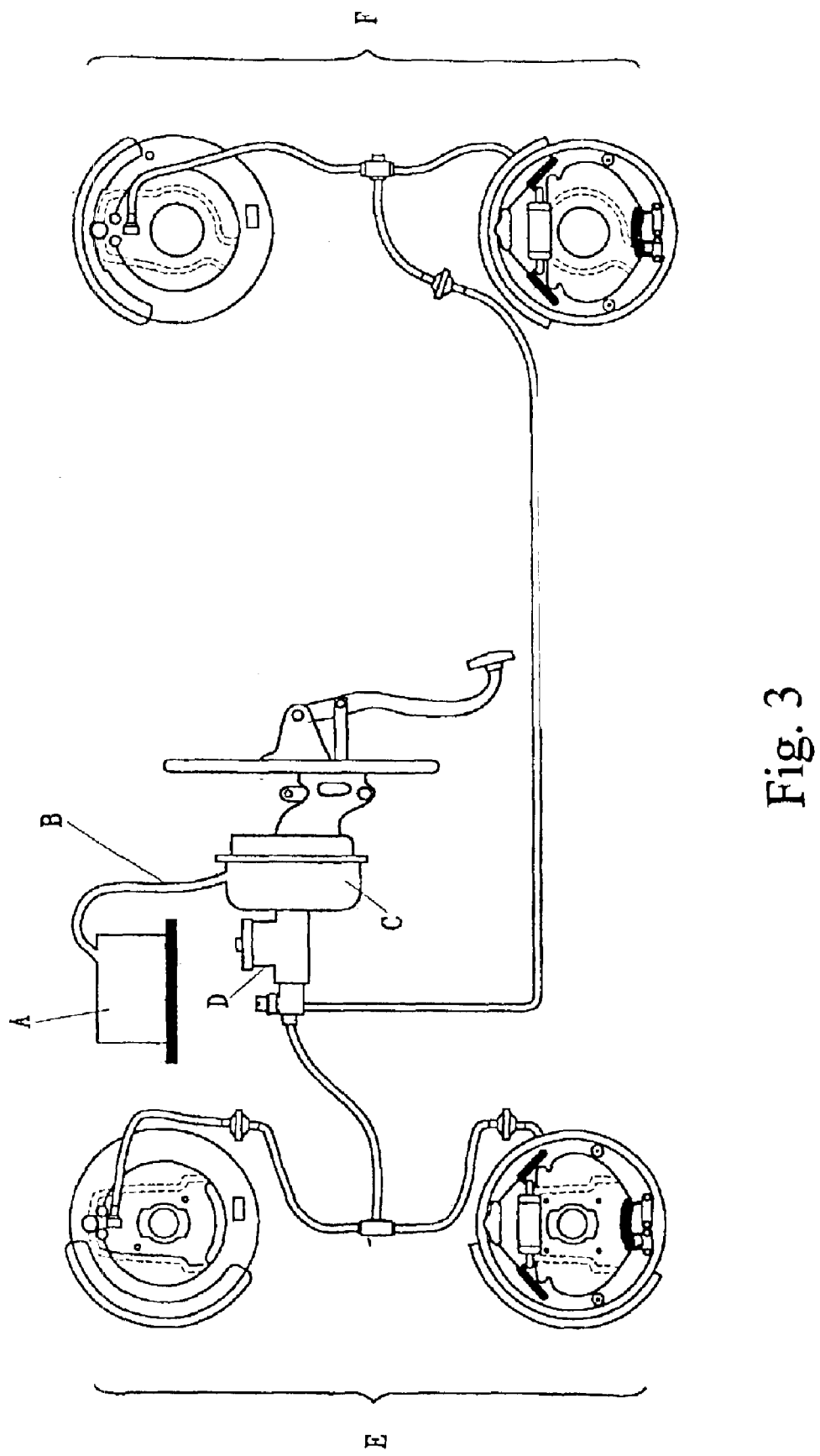
FIG. 3 is a schematic drawing of the present invention applied to the braking system.

FIG. 3 shows a schematic drawing of the present invention applied to the braking system. As described, the filter element of an air filter with far infrared energy will enhance the combustion efficiency inside the engine chamber A and prevent it from carbon deposit. Accordingly, the air density and the vacuum degree of the engine chamber A are increased, thereby raising the vacuum degree inside vacuum pump C through the suction pipe B. In braking, the force of the vacuum pump C upon the braking pump D is even and stable, thereby allowing the braking pump D to stably distribute the braking oil to the brake matching unit. Thereafter, the braking oil is evenly distributed to the front wheel braking system E and the rear wheel braking system F. As a result, the braking system is pressured as designed, thereby reaching the balance brake of the front and the rear wheels at the standard ratio of 7:3 or 6:4. Accordingly, it can be avoided in braking that the head of the car sinks while the tail thereof is raised, thrown away or slipped to the side. Moreover, the braking distance is shortened, thereby ensuring the driving safety.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An air filter with far infrared energy used in an internal combustion engine, comprising:
   a housing,
   a filter element, fitted in said housing, having a through hole in the center as an air inlet;
   a filter main body with far infrared energy fitted in the periphery of said filter element as an air passage for incoming air from said air inlet, having a corrugated substrate embedded with a mixture of aluminum oxide, zirconium oxide, antimony oxide, titanium oxide, cobalt oxide, iron oxide, and silicium carbide; thereby the water molecules contained in said air are broken down into smaller fragments by said energy before entering into said internal combustion engine.

2. The air filter with far infrared energy used in an internal combustion engine as claimed in claim 1, wherein the mixture rate of said far infrared emission substances with said substrate amounts to 2~30% weight percentage.

3. The air filter with far infrared energy used in an internal combustion engine as claimed in claim 1, wherein said far infrared emission substances of said main body are made by mixing aluminum oxide ($Al_2O_3$), zirconium oxide ($ZrO_2$), antimony oxide ($SbO_2$), titanium oxide ($TiO_2$), cobalt oxide (CoO), iron oxide ($Fe_2O_3$) and silicium carbide (SiC) at a weight ratio of 1:1:1:1:1:1.

4. The air filter with far infrared energy used in an internal combustion engine as claimed in claim 1, wherein said far infrared emission substances of said main body are made by mixing aluminum oxide ($Al_2O_3$), zirconium oxide ($ZrO_2$), antimony oxide ($SbO_2$), titanium oxide ($TiO_2$), cobalt oxide (CoO), iron oxide ($Fe_2O_3$) and silicium carbide (SiC) at a weight ratio of 3:3:3:1:1:2:2.

5. The air filter with far infrared energy used in an internal combustion engine as claimed in claim 1, wherein the average grain size of said far infrared emission substances amounts to 0.01~30 um.

6. The air filter with far infrared energy used in an internal combustion engine as claimed in claim 1, wherein said substrate of said main body of said filter element of said air filter is made of pulp.

7. The air filter with far infrared energy used in an internal combustion engine as claimed in claim 1, wherein said substrate of said main body of said filter element of said air filter is made of single polymer material.

8. The air filter with far infrared energy used in an internal combustion engine as claimed in claim 7, wherein said single polymer material of said substrate of said main body of said filter element of said air filter is polyethylene.

9. The air filter with far infrared energy used in an internal combustion engine as claimed in claim 7, wherein said single polymer material of said substrate of said main body of said filter element of said air filter is polypropylene.

10. The air filter with far infrared energy used in an internal combustion engine as claimed in claim 7, wherein said single polymer material of said substrate of said main body of said filter element of said air filter is polyurethane.

11. The air filter with far infrared energy used in an internal combustion engine as claimed in claim 7, wherein said single polymer material of said substrate of said main body of said filter element of said air filter is nylon.

12. The air filter with far infrared energy used in an internal combustion engine as claimed in claim 1, wherein said substrate of said main body of said filter element of said air filter is made of composite polymer material.

* * * * *